United States Patent
Wang et al.

(10) Patent No.: US 12,184,720 B2
(45) Date of Patent: Dec. 31, 2024

(54) KUBERNETES CLUSTER LOAD BALANCE HANDLING METHOD AND APPARATUS, AND STORAGE MEDIUM

(71) Applicant: Hangzhou AliCloud Feitian Information Technology Co., Ltd., Hangzhou (CN)

(72) Inventors: Siyu Wang, Hangzhou (CN); Yu Ding, Hangzhou (CN); Zhen Zhang, Hangzhou (CN)

(73) Assignee: Hangzhou AliCloud Feitian Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/477,169

(22) Filed: Sep. 28, 2023

(65) Prior Publication Data

US 2024/0022629 A1    Jan. 18, 2024

Related U.S. Application Data

(63) Continuation of application No. PCT/CN2022/077746, filed on Feb. 24, 2022.

(30) Foreign Application Priority Data

Mar. 30, 2021   (CN) .......................... 202110343763.6

(51) Int. Cl.
  *H04L 67/1008* (2022.01)
  *H04L 43/028* (2022.01)
  *H04L 67/1014* (2022.01)

(52) U.S. Cl.
  CPC ........ *H04L 67/1008* (2013.01); *H04L 43/028* (2013.01); *H04L 67/1014* (2013.01)

(58) Field of Classification Search
None
See application file for complete search history.

(56) References Cited

U.S. PATENT DOCUMENTS 10,135,675 B2 * 11/2018 Yu ....................... H04L 61/2592
10,333,959 B2 *  6/2019 Katrekar ............. H04L 63/0272
(Continued)

FOREIGN PATENT DOCUMENTS

| CN | 112019622 | 1/2020 |
| CN | 110837418 | 2/2020 |

(Continued)

OTHER PUBLICATIONS

English Translation of PCT written opinion and search report of PCT application No. PCT/CN2022/077746 dated May 9, 2022, for corresponding US Appl. No. 18/477,169, 6 pages.

*Primary Examiner* — Quang N Nguyen
(74) *Attorney, Agent, or Firm* — Lee & Hayes, P.C.

(57) ABSTRACT

The present disclosure discloses a method and apparatus for processing load balancing of a Kubernetes cluster, and a storage medium, wherein the method comprises: acquiring traffic configuration rules for controllers in the Kubernetes cluster by a central control component of the Kubernetes cluster; sending the traffic configuration rules to a proxy container corresponding to each of the controllers; and controlling data interaction between an API server and the controllers through the proxy container based on the traffic configuration rules. According to the present disclosure, the technical problem that load balancing is difficult to achieve due to single-point operation of the controllers caused by a single master is solved.

20 Claims, 9 Drawing Sheets

(56) References Cited

U.S. PATENT DOCUMENTS

| | | | |
|---|---|---|---|
| 10,587,698 B2* | 3/2020 | Dunbar | H04L 67/146 |
| 10,826,770 B2* | 11/2020 | Sethi | H04L 41/40 |
| 2016/0352867 A1 | 12/2016 | Subbarayan et al. | |
| 2018/0063193 A1* | 3/2018 | Chandrashekhar | G06F 11/2035 |

FOREIGN PATENT DOCUMENTS

| | | |
|---|---|---|
| CN | 111800458 | 10/2020 |
| CN | 113312159 A | 8/2021 |

* cited by examiner

KUBERNETES CLUSTER LOAD BALANCE HANDLING METHOD AND APPARATUS, AND STORAGE MEDIUM

CROSS REFERENCE TO RELATED APPLICATION

This application claims priority to and is a continuation of PCT Patent Application No. PCT/CN2022/077746, filed on 24 Feb. 2022 and entitled "KUBERNETES CLUSTER LOAD BALANCE HANDLING METHOD AND APPARATUS, AND STORAGE MEDIUM," which claims priority to Chinese Patent Application No. 202110343763.6, filed on 30 Mar. 2021 and entitled "KUBERNETES CLUSTER LOAD BALANCE HANDLING METHOD AND APPARATUS, AND STORAGE MEDIUM," which are incorporated herein by reference in their entirety.

TECHNICAL FIELD

The present disclosure relates to the technical field of computer technology, and, more particularly, to a method, an apparatus, and storage medium for processing load balancing of a Kubernetes cluster.

BACKGROUND

As the scale of Kubernetes application keeps on expanding, the number and complexity of various controllers and components thereon oriented to final state processing resources also gradually increase, making it increasingly difficult to understand and manage. For example, the single-point operation of the controllers caused by a single master will lead to load balancing failure and horizontal expansion failure, which in turn leads to low operating efficiency of the controllers.

With regard to the above-mentioned problems, no effective solution has yet been proposed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Embodiments of the present disclosure provide a method, an apparatus, and storage medium for processing load balancing of a Kubernetes cluster, to at least solve the technical problem that load balancing is difficult to achieve due to single-point operation of the controllers caused by a single master.

According to an example embodiments of the present disclosure, a method for processing load balancing of a Kubernetes cluster is provided, comprising: acquiring a traffic configuration rules for controllers in the Kubernetes cluster by a central control component of the Kubernetes cluster; sending the traffic configuration rules to a proxy container corresponding to each of the controllers; and controlling data interaction between an API server and the controllers through the proxy container based on the traffic configuration rules.

Further, before controlling data interaction between the API server and the controllers based on the traffic configuration rules through the proxy container, the method further comprises: receiving a data request instruction sent by at least one of a plurality of controllers through the proxy container; sending the data request instruction to the API server through the proxy container, and receiving data sent by the API server.

Further, before controlling data interaction between the API server and the controllers based on the traffic configuration rules through the proxy container, the method further comprises: receiving a data request instruction triggered by the API server through the proxy container; and in response to the data request instruction, receiving data sent by the API server through the proxy container.

Further, the controlling data interaction between the API server and the controllers through the proxy container based on the traffic configuration rules comprises: filtering the received data based on the traffic configuration rules in the proxy container to acquire the filtered data; and sending the filtered data to a controller corresponding to the proxy container.

Further, the controlling data interaction between the API server and the controllers through the proxy container based on the traffic configuration rules comprises: sending the data received by the proxy container to a controller corresponding to the proxy container; when the controller corresponding to the proxy container triggers data processing, calling an interface of the proxy container to determine whether the data conforms to the traffic configuration rules; if so, allowing the controller corresponding to the proxy container to perform the data processing; and if not, disallowing the controller corresponding to the proxy container to perform the data processing.

Further, the traffic configuration rules comprise: a global limit rule and a sharding routing rule. After sending the traffic configuration rules to a proxy container corresponding to each of the controllers, the method further comprises: intercepting requests that do not conform to the global limit rule by the proxy container, and sending requests that conform to the global limit rule to the API server; and/or intercepting a webhook request from the API server by the proxy container; determining whether the webhook request conforms to the sharding routing rule of a current instance; if so, forwarding the request to a local Webhook of the proxy container for processing; and if not, forwarding the request to an instance that conforms to the sharding routing rule for processing.

Further, the method also comprises: setting a security protection strategy in the proxy container, wherein the security protection strategy comprises at least one of the following: traffic limiting, fusing off, and one-click suspension.

Further, the method also comprises: monitoring interaction information between the controller and the API server through the proxy container; and displaying the monitored information on a display interface.

According to an example embodiments of the present disclosure, an apparatus for processing load balancing of a Kubernetes cluster is provided, comprising: a first acquisition unit, configured to acquire traffic configuration rules for controllers in the Kubernetes cluster by a central control component of the Kubernetes cluster; a first sending unit, configured to send the traffic configuration rules to a proxy container corresponding to each of the controllers; and a first control unit, configured to control data interaction between an API server and the controllers based on the traffic configuration rules through the proxy container.

Further, the apparatus also comprises: a first receiving unit, configured to receive a data request instruction sent by at least one of the plurality of controllers before controlling data interaction between the API server and the controllers based on the traffic configuration rules through the proxy container; and a second receiving unit, configured to send the data request instruction to the API server through the proxy container, and receive data sent by the API server.

Further, the apparatus also comprises: a third receiving unit, configured to receive a data request instruction triggered by the API server through the proxy container before controlling data interaction between the API server and the controllers based on the traffic configuration rules through the proxy container; and a first response unit, configured to, in response to the data request instruction, receive data sent by the API server through the proxy container.

Further, the first control unit comprises: a first processing module, configured to filter the received data based on the traffic configuration rules in the proxy container to acquire the filtered data; and a first sending module, configured to send the filtered data to a controller corresponding to the proxy container.

Further, the first control unit comprises: a first receiving module, configured to send data received by the proxy container to a controller corresponding to the proxy container; and a first calling module, configured to, when the controller corresponding to the proxy container triggers data processing, call an interface of the proxy container to determine whether the data conforms to the rules based on the traffic configuration rules; if so, allow the controller corresponding to the proxy container to perform the data processing; and if not, disallow the controller corresponding to the proxy container to perform the data processing.

Further, the traffic configuration rules comprise: global limit rules and sharding routing rules, and after sending the traffic configuration rules to a proxy container corresponding to each of the controllers, the apparatus further comprises: a second sending unit, configured to intercept requests that do not conform to the global limit rules by the proxy container, and send requests that conform to the global limit rules to the API server; and/or a first determination unit, configured to intercept a Webhook request from the API server by the proxy container; determine whether the webhook request conforms to the sharding routing rules of a current instance; if so, forward the request to a local Webhook of the proxy container for processing; and if not, forward the request to an instance that conforms to the rules for processing.

Further, the apparatus also comprises: a first setting unit, configured to set a security protection strategy in the proxy container, wherein the security protection strategy comprises at least one of the following: traffic limiting, fusing off, and one-click suspension.

Further, the apparatus also comprises: a first monitoring unit, configured to monitor interaction information between the controller and the API server through the proxy container; and a first display unit, configured to display the monitored information on a display interface.

According to an example embodiments of the present disclosure, a storage medium is provided, comprising a program stored therein, wherein the program executes any one of the methods described above.

According to an example embodiments of the present disclosure, a device is provided, comprising: a processor; and a storage medium connected to the processor and configured to provide the processor with instructions for processing the following processing steps: acquiring traffic configuration rules for controllers in the Kubernetes cluster by a central control component of the Kubernetes cluster; sending the traffic configuration rules to a proxy container corresponding to each of the controllers; and controlling data interaction between the API server and the controllers through the proxy container based on the traffic configuration rules.

In the embodiments of the present disclosure, the data interaction between the API server and the controllers is controlled through the proxy container based on the pre-configured traffic configuration rules. Specifically, the central control component of the Kubernetes cluster acquires the traffic configuration rules for the controllers in the Kubernetes cluster; the traffic configuration rules are sent to a proxy container corresponding to each of the controllers; the data interaction between the API server and the controllers is controlled through the proxy container based on the traffic configuration rules, so that a plurality of controllers request data from the API server at the same time, and the data received by the controllers conforms to the rules in the traffic configuration rules, thereby realizing parallel running of the plurality of controllers, hence achieving the technical effect of load balancing of controllers in the Kubernetes cluster, and solving the technical problem that load balancing is difficult to achieve due to single-point operation of the controllers caused by a single master.

BRIEF DESCRIPTION OF DRAWINGS

The accompanying drawings described herein are intended to provide a further understanding of the present disclosure, and constitute a part of the present disclosure. The illustrative embodiments of the present disclosure and the descriptions thereof are used to explain the present disclosure, and do not constitute an improper limitation to the present disclosure. In the drawings.

DESCRIPTION OF EMBODIMENTS

In order to allow those skilled in the art to better understand the solutions of the present disclosure, the technical solutions in the embodiments of the present disclosure will be clearly and completely described below with reference to the accompanying drawings in the embodiments of the present disclosure. Obviously, the described embodiments are merely some but not all of the embodiments of the present disclosure. Other embodiments acquired by those of ordinary skill in the art on the basis of the embodiments of the present disclosure without creative efforts shall all fall within the protection scope of the present disclosure.

It should be noted that the terms "first'," "second," and the like in the description, claims, and above-mentioned drawings of the present disclosure are used to distinguish similar objects, and are not necessarily used to describe a specific order or sequence. It should be understood that data used in this way can be interchanged where appropriate, so that the embodiments of the present disclosure described herein may be implemented in an order other than those illustrated or described herein. In addition, the terms "comprising" and "having" and any variations thereof are intended to cover non-exclusive inclusions. For example, a process, method, system, product, or device that contains a series of steps or units is not necessarily limited to the steps or units explicitly listed, and may instead include other steps or units not explicitly listed or inherent to these processes, methods, products, or devices.

First, some of the nouns or terms that appear in the description of the embodiments of the present disclosure are explained as follows:

Kubernetes: an open source container orchestration engine that supports automated deployment, large-scale scalability, and application container management.

Controller: the controller in the present disclosure refers to a controller in Kubernetes that is oriented to final state processing resources.

Webhook: the Hook when a resource object in Kubernetes submits a create/update/delete request to the Apiserver.

Operator: an extended custom addon component in Kubernetes, generally implemented as a controller and a Webhook.

According to the embodiments of the present disclosure, an embodiment of a method for processing load balancing of a Kubernetes cluster is provided. It should be noted that the steps shown in the flow chart in the accompanying drawing may be executed, for example, as a set of computer-executable instructions in a computer system. Although a logical sequence is shown in the flow chart, in some cases, the steps shown or described herein may be executed in a different sequence.

Figure 1:
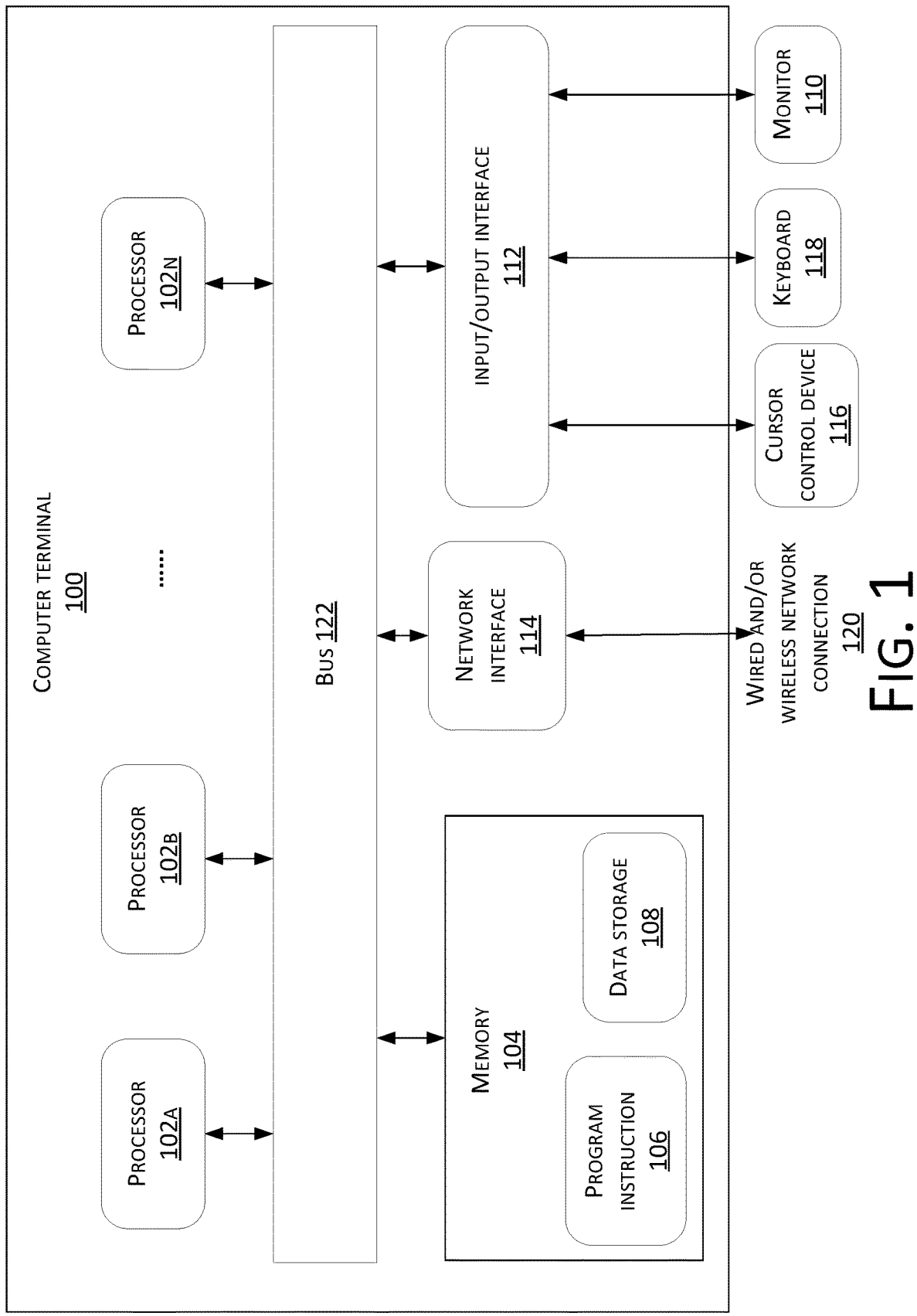
FIG. 1 is a hardware structural block diagram of a computer terminal according to an embodiment of the present disclosure.

The method embodiment provided in the embodiment of the present disclosure may be executed in a mobile terminal, a computer terminal, or a similar computing apparatus. FIG. 1 shows a hardware structural block diagram of a computer terminal (or mobile device) for implementing a method for processing load balancing of a Kubernetes cluster. As shown in FIG. 1, computer terminal 100 (such as a mobile device) may comprise one or more (shown in FIG. 1 as 102a, 102b, . . . , 102n) processors 102 (processor 102 may include, but is not limited to, processing apparatuses such as microprocessor MCUs or programmable logic device such as FPGAs), memory 104 configured for storing data, and a transmission apparatus configured for communication. The memory 104 stores program instructions 106 and data storage 108. In addition, it may further comprise: a display such as a monitor 110, an input/output interface (I/O interface) 112, a universal serial bus (USB) port (can be included as one of the ports of the I/O interface, not shown in FIG. 1), a network interface 114, a power supply (not shown in FIG. 1), and/or a camera (not shown in FIG. 1). The input/output interface may connect with a cursor control device 116 and a keyboard 118. The network interface 114 may connect with wired and/or wireless network connection 120. The components of the computer terminal 100 may be connected with a bus 122. Those of ordinary skill in the art may understand that the structure shown in FIG. 1 is illustrative only, and does not limit the structure of the above-mentioned electronic apparatus. For example, computer terminal 100 may also comprise more or fewer components than those shown in FIG. 1, or have a configuration different from that shown in FIG. 1.

It should be noted that the above-mentioned one or more processors 102 and/or other data processing circuits may be generally referred to herein as a "data processing circuit." The data processing circuit may be embodied as a whole or in part as software, hardware, firmware, or any other combinations. In addition, the data processing circuit may be a stand-alone processing module, or may be fully or partially integrated into any one of the other elements within computer terminal 100 (or mobile device). As involved in the embodiment of the present disclosure, the data processing circuit may serve as a processor control (for example, a selection of a variable resistor terminal path connected to an interface).

Memory 104 may be configured to store software programs and modules of application software, such as a program instruction/data storage apparatus corresponding to the method for processing load balancing of a Kubernetes cluster in the embodiments of the present disclosure. Processor 102 runs the software programs and modules stored in memory 104 to execute various function applications and data processing, implementing the above-mentioned method for processing load balancing of a Kubernetes cluster of an application program. Memory 104 may comprise a high-speed random access memory, and may also comprise a non-volatile memory, such as one or more magnetic storage apparatuses, flash memories, or other non-volatile solid-state memories. In some examples, memory 104 may further comprise memories remotely disposed with respect to processor 102, and these remote memories may be connected to computer terminal 100 via a network. Examples of the above-mentioned network include, but are not limited to, the Internet, corporate intranets, local area networks, mobile communication networks, and combinations thereof.

Transmission apparatus is configured to receive or send data via a network. Specific examples for the above-mentioned network may comprise a wireless network provided by the communication provider of computer terminal 100. In one example, transmission apparatus comprises a network adapter (Network Interface Controller, NIC), which may be connected to other network devices through a base station, such that communication with the Internet is made possible. In one example, transmission apparatus may be a radio frequency (RF) module, which is used to communicate with the Internet in a wireless manner.

The display may be, for example, a touch screen liquid crystal display (LCD), which enables a user to interact with a user interface of computer terminal 100 (or mobile device).

Figure 2:
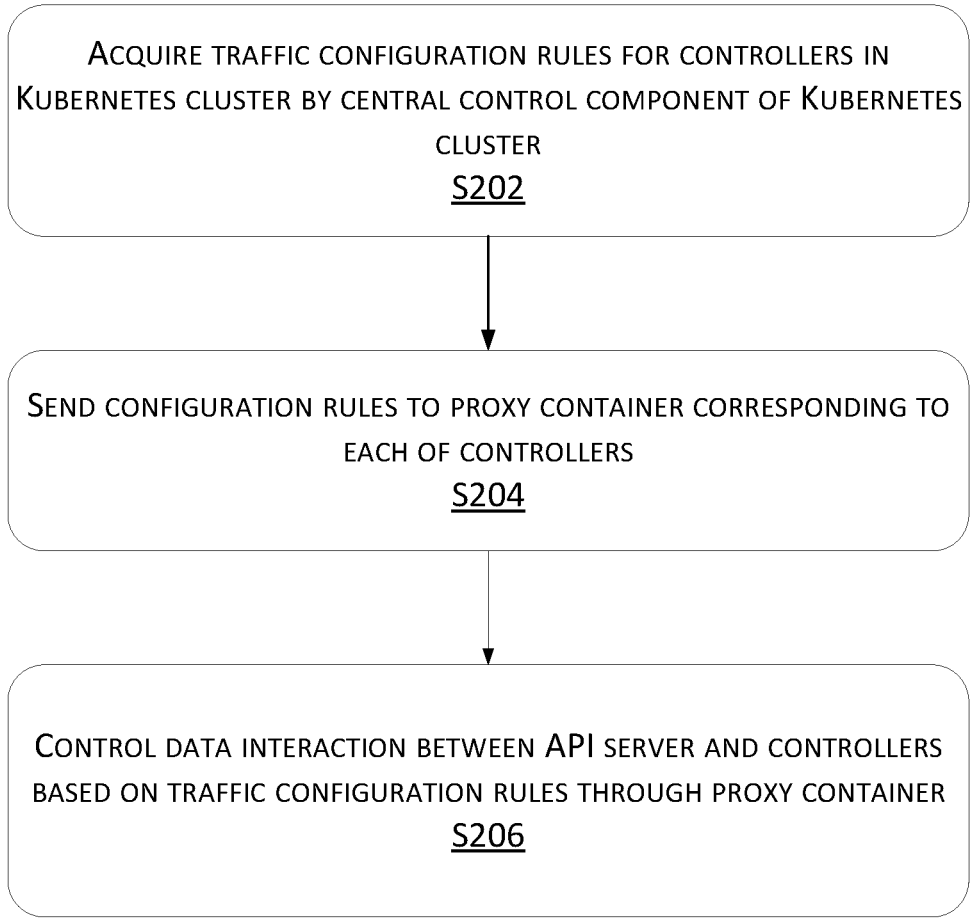
FIG. 2 is a flow chart of a method for processing load balancing of a Kubernetes cluster provided according to an example embodiment of the present disclosure.

In the above operating environment, the present disclosure provides a method for processing load balancing of a Kubernetes cluster as shown in FIG. 2. FIG. 2 is a flow chart of a method for processing load balancing of a Kubernetes cluster according to an embodiment of the present disclosure.

Figure 3:
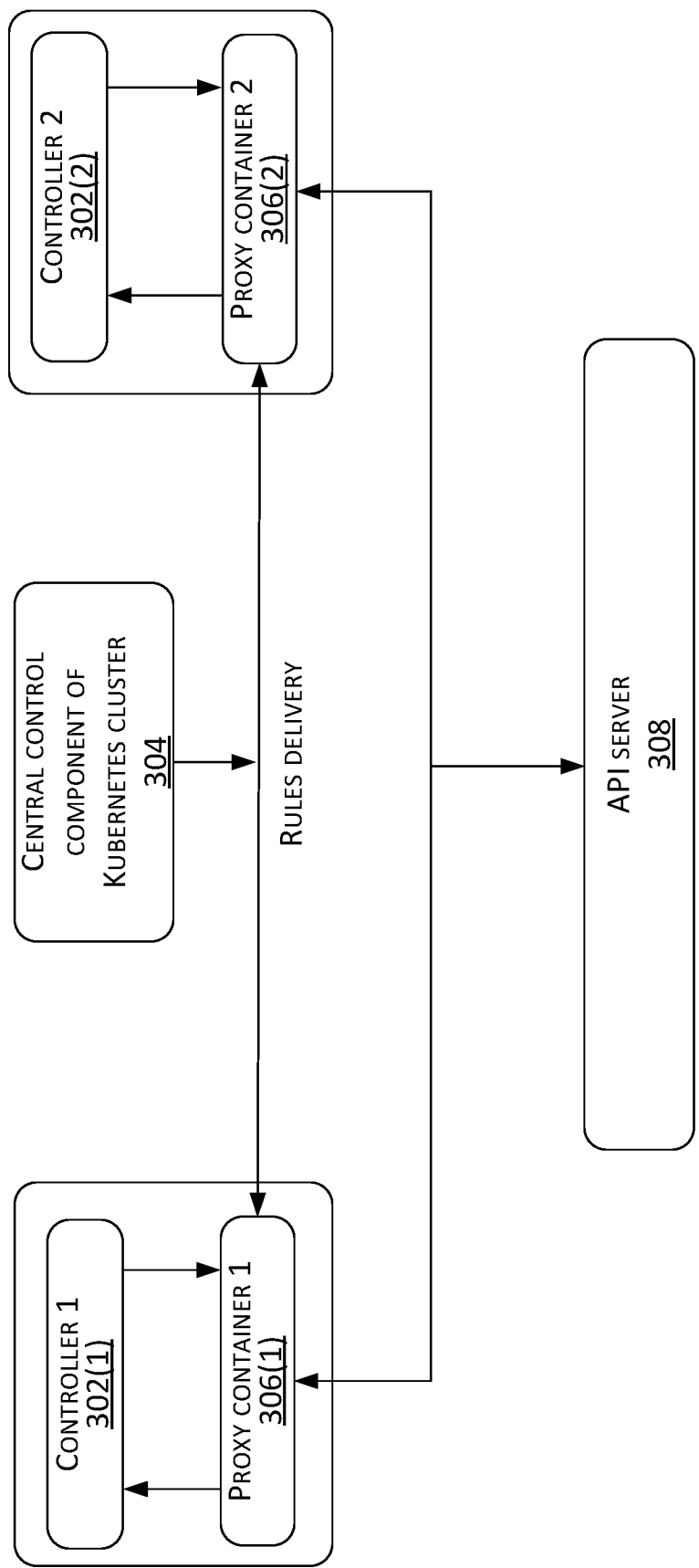
FIG. 3 is a first schematic of the method for processing load balancing of a Kubernetes cluster provided according to the example embodiment of the present disclosure.

Step S202, acquire traffic configuration rules for controllers (such as controller 1 3021(1) and controller 2 302(2) in FIG. 3) in the Kubernetes cluster by a central control component of the Kubernetes cluster 304.

As shown in FIG. 3, the control plane is responsible for managing and configuring the traffic configuration rules of the controllers in the Kubernetes cluster, so as to adjust the routing traffic or data received by the controllers.

Step S204, send the traffic configuration rules to a proxy container corresponding to each of the controllers. For example, in FIG. 3, the proxy container 1 306(1) corresponds to the controller 1 3021(1), and the proxy container 2 306(2) corresponds to the controller 2 302(2).

The traffic configuration rules comprise traffic configuration rules for a plurality of controllers in the Kubernetes cluster, and the traffic configuration rules are transmitted to a proxy container corresponding to each of the controllers.

Step S206, control data interaction between an API server 308 and the controllers 302(1) and 302(2) based on the traffic configuration rules through the proxy container 306(1) and 306(2).

Through the above steps, a plurality of controllers can request data from the API server at the same time, and the data received by the controllers conforms to the rules in the traffic configuration rules, thereby realizing parallel running of the plurality of controllers, achieving the technical effect of load balancing for controllers in the Kubernetes cluster, and solving the technical problem that load balancing is difficult to achieve due to single-point operation of the controllers caused by a single master.

For example, in the method for processing load balancing of a Kubernetes cluster provided by the present disclosure, before controlling data interaction between the API server and the controllers based on the traffic configuration rules through the proxy container, the method further comprises: receiving a data request instruction sent by at least one of a plurality of controllers through the proxy container; and sending the data request instruction to the API server through the proxy container, and receiving the data returned by the API server.

Figure 4:
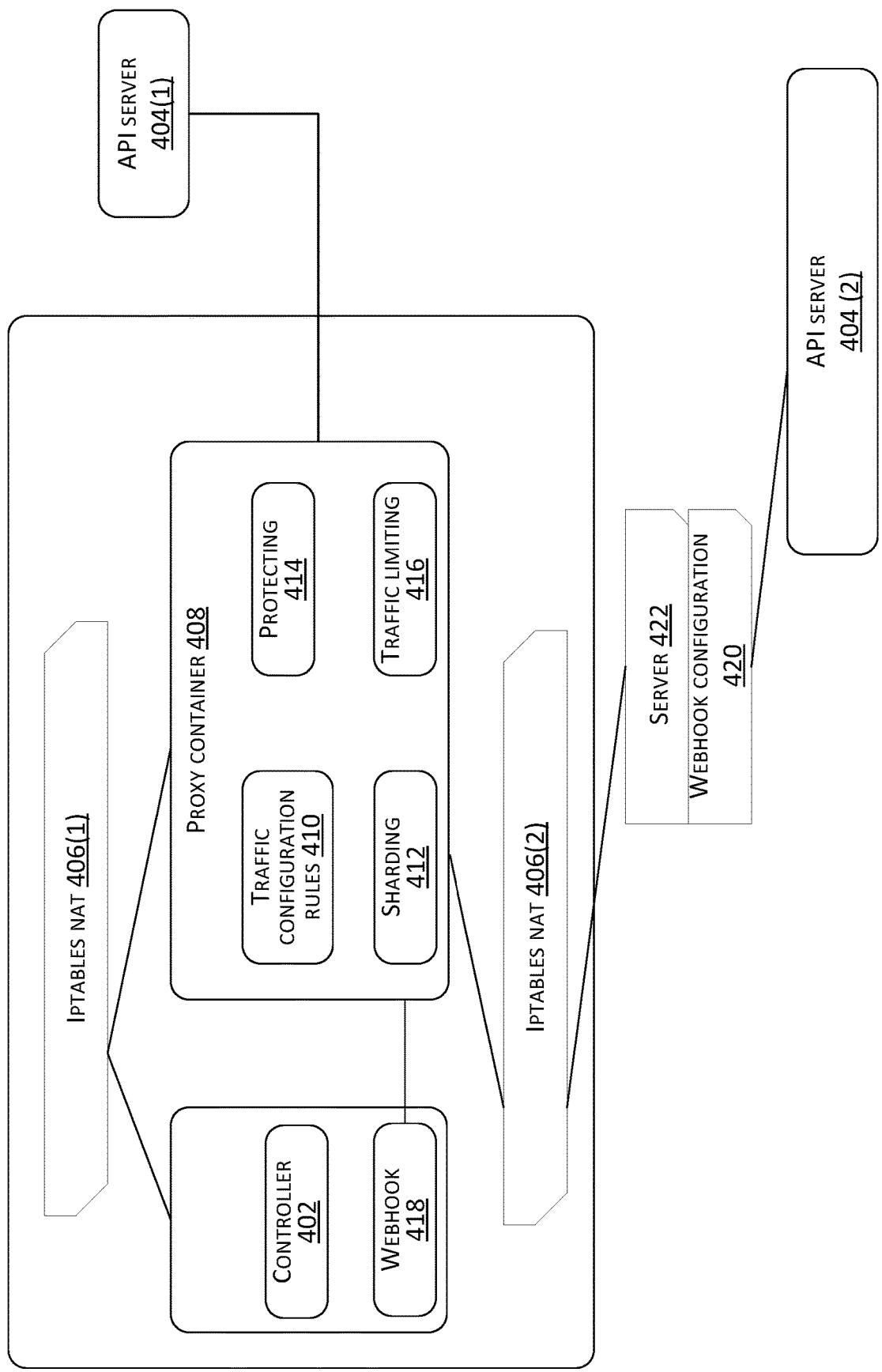
FIG. 4 is a second schematic of the method for processing load balancing of a Kubernetes cluster provided according to the example embodiment of the present disclosure.

As shown in FIG. 4, after the controller 402 in the operator triggers the data request instruction to the API server such as API server 404(1), the data request instruction sent by the controller 402 is intercepted by the iptables nat mechanism such as ip tables nat 406(1). It should be noted that the data request instruction is an instruction used to request data, which can be used to request data query, data read and write, etc. The data request instruction is forwarded to the proxy container 408 corresponding to the controller 402 and is sent to the API server 404 through the proxy container 408, and the data returned by the API server 404 is received. The received data is filtered in the proxy container 408 based on the traffic configuration rules 410 to acquire the filtered data; and the filtered data is sent to the controller 402 corresponding to the proxy container 408. In addition, the proxy container 408 can also perform rule routing, fusing off, monitoring, etc. based on the traffic configuration rules. These proxy containers together form a network to intercept the network communication between the Operator and the API server 404. In the example of FIG. 4, the proxy container 408 performs sharding 412, protecting 414, and traffic limiting 416.

As shown in FIG. 4, after the controller 402 in the operator triggers the data request instruction to the API server 404(1), iptables nat 406(1) intercepts the data request instruction sent by the API server 404(1), and sends the data request instruction to the proxy container 408 corresponding to the API server 404(1). Through the proxy container 408, the data request instruction is sent to the API server 404(1) and the data returned by the API server 404(1) is received. At the proxy container 408, the received data is filtered based on the traffic configuration rule to obtain the filtered data. The filter data is sent to the controller 402 corresponding to the proxy container 408.

After the data received by the proxy container 408 is sent to the controller 402 corresponding to the proxy container 408, when the controller 402 corresponding to the proxy container 408 triggers data processing, an interface of the proxy container 408 is called to determine whether the data conforms to the traffic configuration rules 410; if so, the controller 402 corresponding to the proxy container 408 is allowed to perform the data processing; and if not, the controller 402 corresponding to the proxy container 408 is disallowed to perform the data processing.

For example, in the method for processing load balancing of a Kubernetes cluster provided by the present disclosure, before controlling data interaction between the API server 404 and the controllers 402 based on the traffic configuration rules 410 through the proxy container 408, the method further comprises: receiving a data request instruction triggered by the API server 404 through the proxy container 408; and in response to the data request instruction, receiving data requested by the API server 404 through the proxy container 408.

As shown in FIG. 4, after the API server 404(2) sends a data request instruction to the webhook server 418 in the operator, the data request instruction sent by the API server 404(2) is intercepted by the iptables nat mechanism 406(2), and the data request instruction is forwarded to the proxy container 408 corresponding to the controller 402, and is sent to the corresponding webhook server 418 through the proxy container 408. The webhook configuration 420 may be stored in the server 422.

For example, in the method for processing load balancing of a Kubernetes cluster provided by the present disclosure, the traffic configuration rules comprise: global limit rules and sharding routing rules, and after sending the traffic configuration rules to a proxy container corresponding to each of the controllers, the method further comprises: intercepting requests that do not conform to the global limit rules by the proxy container, and sending requests that conform to the global limit rules to the API server; and/or intercepting a webhook request from the API server by the proxy container; determining whether the webhook request conforms to the sharding routing rules of a current instance; if so, forwarding the request to a local webhook server of the proxy container for processing; and if not, forwarding the request to an instance that conforms to the rules for processing.

In the traffic control dimension, it is divided into: global limit rules, that is, limit rules that are effective for all such operator instances, configured for overall isolation and limit; and sharding routing rules: different subsets handle resources of different sharding rules, configured for horizontal expansion or grayscale upgrade. The traffic control by a controller is divided into two methods: the first type: hard limit, where the traffic control is completely implemented at the proxy container side. For example, the proxy container intercepts requests triggered by the controller that do not conform to the global limit rules, and sends requests that conform to the global limit rules to the API server; and/or the proxy container intercepts the data returned from the API server, and sends the requests that conform to the global limit rules back to the controller, and filters out the data that does not conform to the global limit rules. The second type, dynamic limit, where the work queue request control is realized through the interaction between the controller and the proxy container. For example, whether the data processing request conforms to the sharding routing rules of a current instance is determined; if so, the controller is allowed to process it; if not, the controller is disallowed to process the data. It should be noted that the global traffic control can only be implemented by hard limit, while the sharding traffic control can be implemented either by hard limit or dynamic limit.

Figure 5:
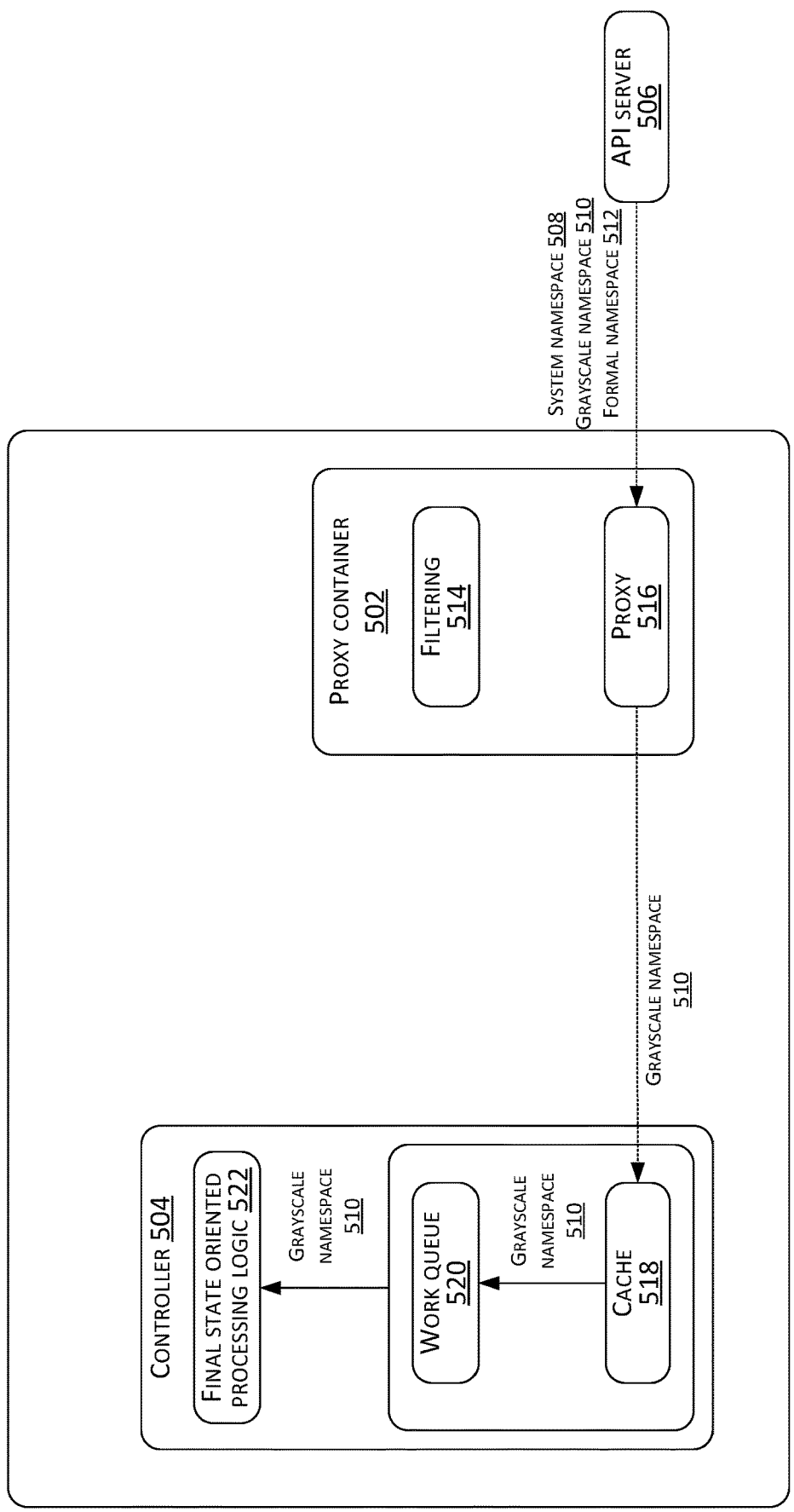
FIG. 5 is a schematic of hard limit in the method for processing load balancing of a Kubernetes cluster provided according to the example embodiment of the present disclosure.

As shown in FIG. 5, hard limit is used for traffic control at the proxy container side: the data request results of the controller will be filtered by the proxy container 502, and only the lists that conform to the rules will be returned to the controller for processing. At the same time, operations, such as acquisition, adding, updating, and deleting, performed on objects that do not conform to their own rules will also be returned by the controller. Therefore, hard limit can be understood as a kind of isolation similar to multi-tenancy. The controller can only see and operate resource objects that conform to their own rules, while all other objects are nonexistent to this controller. The advantages of hard limit include: strong isolation, which is very thorough; a controller can only pull objects that conform to rules, that is, the controller will cache these objects only; and there is no need to control and modify any code, and any number of controllers that process namespace dimension resources can be limited. The disadvantages of hard limit are: if the controller needs to focus on cluster dimension resources, and process other namespace dimension resources according to the cluster dimension resources, grayscale upgrade and horizontal sharding cannot be achieved by hard limit in this case; when adjusting the rules, the proxy container will disconnect the corresponding controller to trigger the restart of the controller, so as to redo operations such as data pull and focus.

Namespaces are used to isolate the resources and application scope of different environments. For example, the grayscale namespace is the namespace for grayscale environments, which is used for storing grayscale release-related configuration items, etc. The formal namespace is the namespace for non-grayscale environments, and the system namespace is used for defining the commonly used value and reference data types, and foundation classes and base classes for events and event handlers, interfaces, and features.

As shown in FIG. 5, hard limit is used for traffic control at the proxy container 502. To illustrate with the example that the controller 504 handles the grayscale namespace, the API server 506 sends the data requests of three different namespaces (such as the system namespace 508, the grayscale namespace 510, and the formal namespace 512 as shown in FIG. 5) to the proxy container 502. The proxy container 502, according to the flow control policy of the controller 504 that only handles the data requests of the grayscale namespace, filters out the data requests corresponding to the system namespace 508 and the formal namespace 512, and sends the data request corresponding to the grayscale namespace to the controller 504. The proxy container 502 includes the filtering 514 and proxy 516 to process the filtering. The controller 504 stores the data request corresponding to the grayscale namespace 510 in the cache 518, and the work queue 520 reads the data request corresponding to that grayscale namespace 510 from the cache 518 and the controller 504 processes the grayscale namespace 510 according to the final state oriented processing logic.

Figure 6:
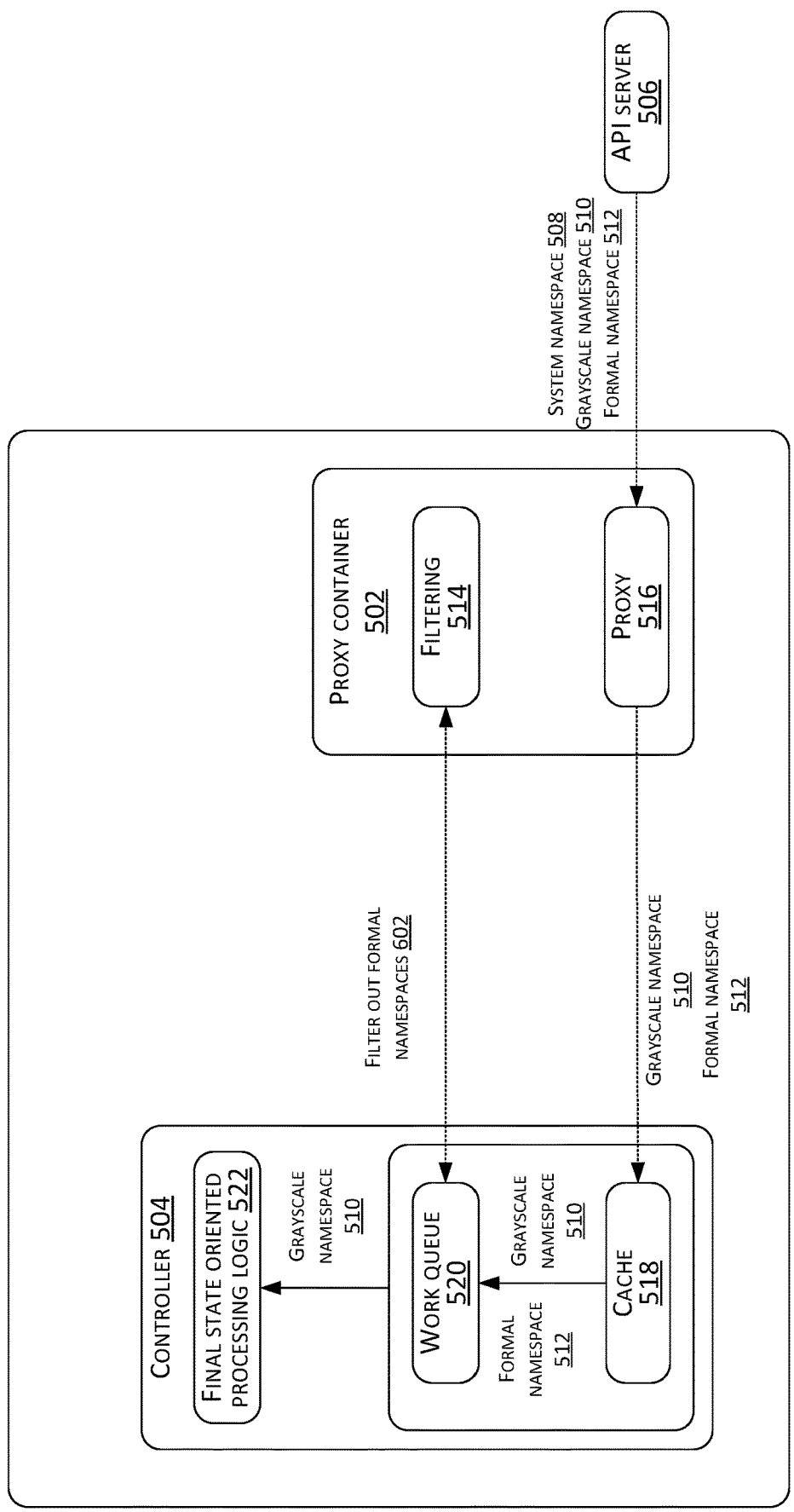
FIG. 6 is a schematic of dynamic limit in the method for processing load balancing of a Kubernetes cluster provided according to the example embodiment of the present disclosure.

As shown in FIG. 6, dynamic limit realizes work queue request control through the interaction between code dependency and the proxy container. After the sharding rules are configured, the proxy container will still pass all objects that conform to the global limit rules to the controller side, the work queue of the controller calls the interface of a local controller to determine whether the request conforms to the current sharding rules during queue-in and queue-out, and if not, it will be discarded without processing. Dynamic limit has good compatibility, and supports controllers with complex operation of interaction between namespace dimension and cluster dimension resources. When adjusting the rules, the controller does not need to be restarted, but can dynamically put new rules into effect. The disadvantages of dynamic limit are that all resource objects that meet the global limit will be cached locally in the controller, the memory usage will be larger than that of hard limit, and the isolation is not thorough. Although the actual processing guarantees a processing in accordance with the routing rules, direct query can retrieve all objects. Slight changes of operator code are required, just by replacing one line of code dependency.

As shown in FIG. 6, the dynamic limitation completes the work queue request control through the interaction between the code dependency and the proxy container 502, and is illustrated by the example that the controller 504 only handles the grayscale namespace 510. The API server 506 sends the data requests of three different namespaces (such as the system namespace 508, the grayscale namespace 510, and the formal namespace 512 as shown in FIG. 6) to the proxy container 502. The proxy container 502 filters out the data requests corresponding to the system namespace 508 according to the traffic control policy, and sends the data requests corresponding to the grayscale namespace 510 and the data requests corresponding to the formal namespace 512 to the controller 504. The controller 504 stores the data requests corresponding to the grayscale namespace 510 and the data requests corresponding to the formal namespace 512 in the cache 518. The work queue 520 requests the data request from the cache 518, and the work queue 520 calls the interface of the controller 504 to determine whether this data request meets the current slicing rules at the time of queue entry and queue exit. If the data request does not meet, it is directly discarded without processing, such that the data request corresponding to the formal namespace 512 is discarded, and then the data request corresponding to the grayscale namespace 510 is processed. For example, at 602, the data request corresponding to the formal namespace 512 is filtered out.

Figure 7:
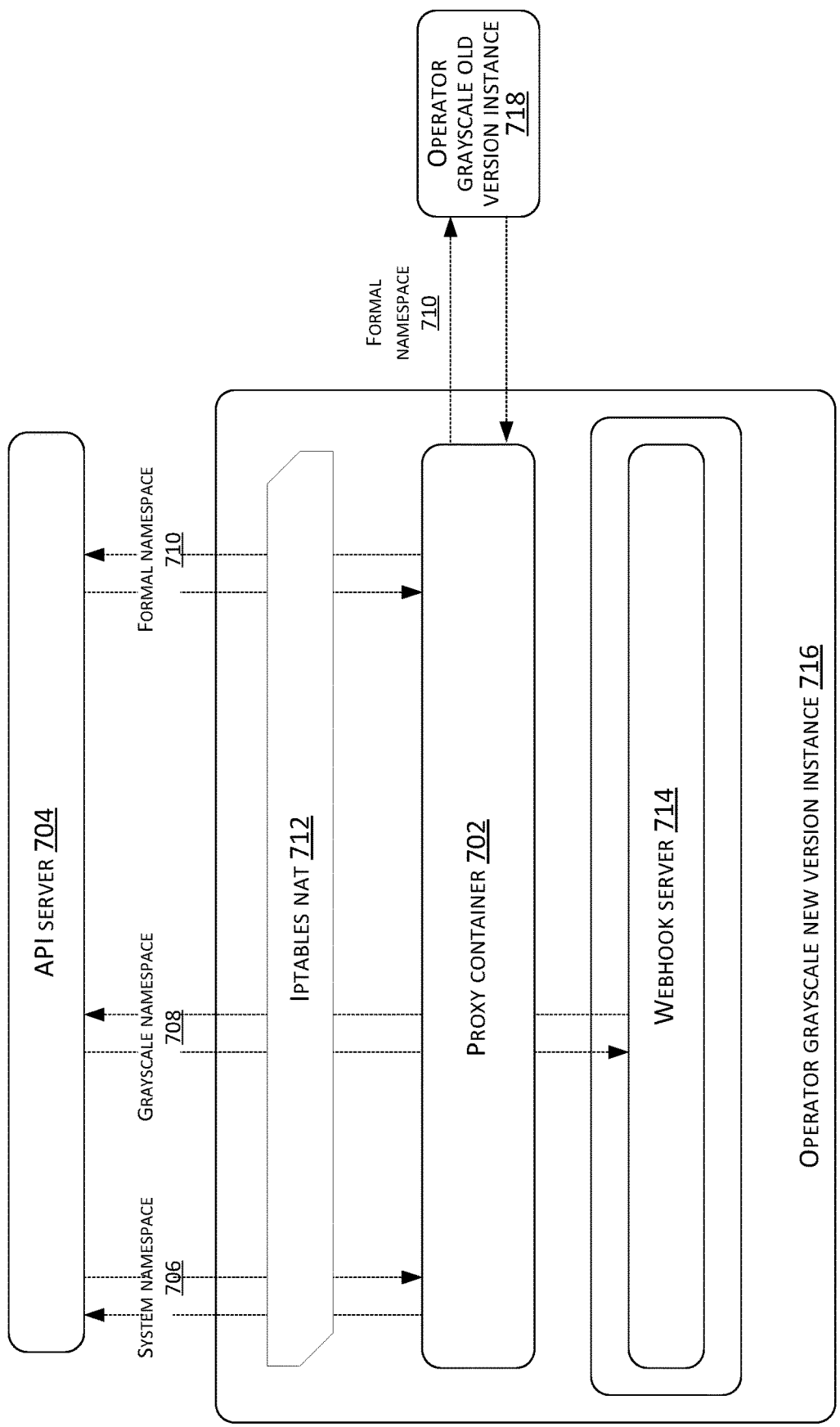
FIG. 7 is a schematic of Webhook traffic control in the method for processing load balancing of a Kubernetes cluster provided according to the example embodiment of the present disclosure.

In addition, as to the Webhook server traffic control, as shown in FIG. 7, the traffic control of the controller by the proxy container does not differentiate between hard limit and dynamic limit. For global limit rules: proxy control will dynamically focus on the configuration in the Virtual Operator and write filtering rules into it. After writing, for resource objects that do not conform to the global limit rules, the API server will not call the Webhook processing. Because the writing is asynchronous, in a short period of time, it is possible that the Operator will still receive object requests from the API server that do not conform to the rules. At this time, the proxy container will intercept the requests and directly return success to the API server, ensuring that they will not be passed to the Webhook service.

As shown in FIG. 7, as to the Webhook server traffic control, the proxy container 702 does not differentiate between hard limit and dynamic limit on the controller's traffic control. The API server 704 initiates the webhook requests for three different namespaces (e.g., the system namespace 706, the grayscale namespace 708, and the formal namespace 710 as shown in FIG. 7). The webhook requests from the API server 704 are intercepted through the iptables nat 712 mechanism, and the webhook requests are forwarded to the proxy container 702. The proxy container 702 filters the webhook requests for the three different namespaces, discards the webhook request corresponding to the system namespace 706, and sends the webhook request corresponding to the grayscale namespace 708 to the webhook server 714 in the new version of operator grayscale instance 716 for processing, and sends the webhook request corresponding to the formal namespace 71- to the webhook server in the old version of operator grayscale instance 718 for processing.

For sharding routing rules: after the proxy container intercepts a request from the API server, it first determines whether the request conforms to the sharding rules of this instance, if so, forwards it directly to the local Webhook for processing, and if not, forwards it to an instance conforming to the rules for processing. It shall also be noted that the local certificate address, listening port, configuration, service name, and other information of the Webhook need to be predefined in the Virtual Operator.

In addition, in the method for processing load balancing of a Kubernetes cluster provided by the present disclosure, by injecting fault scenarios at the proxy side, fault logic verification can be performed on one or more controller instances, so that fault scenarios can be simulated to ensure controller security.

For example, in the method for processing load balancing of a Kubernetes cluster provided by the present disclosure, the method further comprises: setting a security protection strategy in the proxy container, wherein the security protection strategy comprises at least one of the following: traffic limiting, fusing off, and one-click suspension.

The above-mentioned traffic limiting is to prevent the controller from frequently requesting the API server, resulting in excessive stress on the API server and service unavailability. Proxy container can be used to implement traffic limiting to the controller's request for API server call, such as the maximum allowed calls per second.

The above-mentioned fusing off means that when an exception occurs to the API server, all requests from the controller can be cut off through the proxy container, so as to avoid an avalanche-like stress effect on the API server, facilitating rapid recovery of the API server.

The above-mentioned one-click suspension means that when the controller has a failure, all requests and data returned from the API server to the controller can be filtered out through the proxy container, so that the controller stops working.

For example, in the method for processing load balancing of a Kubernetes cluster provided by the present disclosure, the method further comprises: monitoring interaction information between the controller and the API server through the proxy container; and displaying the monitored information on a display interface.

The data monitored by the proxy container can be divided into external monitoring and injected monitoring. Through the external monitoring of calls between the Operator and the API server by the proxy container, statistics of service request indicators such as performance, delay, traffic, and errors are acquired. If the Operator replaces the code dependencies, logic-related indicators inside the controller and Webhook, such as queue accumulation, processing performance changes, memory consumption tracking, and operating status, can also be acquired. All such indicators can be displayed on the display interface as monitored information, so as to improve the speed for users to acquire effective information. In addition, users can also configure the acquisition of Prometheus server to meet their own monitoring needs.

It should be noted that with regard to the above-described method embodiments, in order to provide a concise description, the method embodiments are all expressed as a series of action combinations. Those skilled in the art, however, should know that the present disclosure is not limited by the described sequence of actions as some steps may be executed in another sequence or simultaneously according to the present disclosure. Secondly, those skilled in the art should also know that the embodiments described in the description are all example embodiments, and the involved actions and modules are not necessarily required by the present disclosure.

Based on the description of the foregoing embodiments, those skilled in the art can clearly understand that the methods of the foregoing embodiments can be implemented using software and a needed universal hardware platform, and can certainly be implemented also by using hardware; in many cases, the former is a better implementation however. Based on such an understanding, the part of the technical solution of the present disclosure, which is essential or contributes to the prior art, can be embodied in the form of a software product. The computer software product is stored in a storage medium (such as a ROM/RAM, a magnetic disk, and an optical disk) and comprises several instructions for enabling a terminal device (which may be a mobile phone, a computer, a server, a network device, or the like) to execute the method of each embodiment of the present disclosure.

Figure 8:
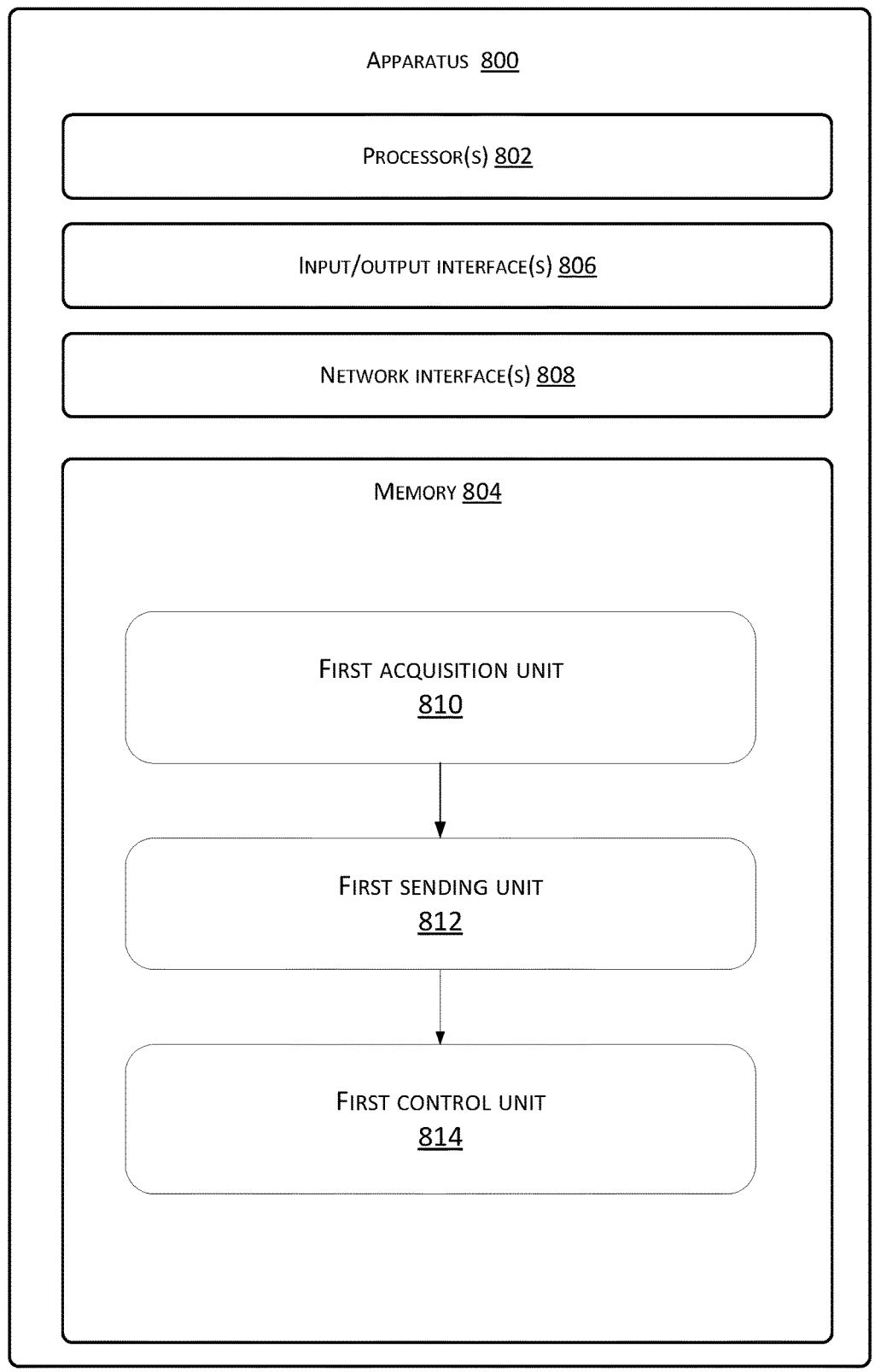
FIG. 8 is a schematic of an apparatus for processing load balancing of a Kubernetes cluster provided according to another example embodiment of the present disclosure.

According to embodiments of the present disclosure, an apparatus for implementing the above-described load balancing processing of a Kubernetes cluster is further provided as shown in FIG. 8.

As shown in FIG. 8, the apparatus 800 includes one or more processor(s) 802 or data processing unit(s) and memory 804. The apparatus 800 may further include one or more input/output interface(s) 806 and one or more network interface(s) 808.

The memory 804 is an example of computer readable media. The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media or transitory media such as a modulated data signal and carrier.

The memory 804 may store therein a plurality of modules or units including a first acquisition unit 810, a first sending unit 812, and a first control unit 814.

For example, the first acquisition unit 810 is configured to acquire traffic configuration rules for controllers in the Kubernetes cluster by a central control component of the Kubernetes cluster;

the first sending unit 812 is configured to send the traffic configuration rules to a proxy container corresponding to each of the controllers;

the first control unit 814 is configured to control data interaction between an API server and the controllers based on the traffic configuration rules through the proxy container.

For example, in the apparatus for processing load balancing of a Kubernetes cluster provided in the embodiment of the present disclosure, the apparatus further comprises: a first receiving unit, configured to, before controlling data interaction between the API server and the controllers based on the traffic configuration rules through the proxy container, receive data request instructions sent by at least one of a plurality of controllers through the proxy container; and a second receiving unit, configured to send the data request instructions to the API server through the proxy container, and receive data sent by the API server.

For example, in the apparatus for processing load balancing of a Kubernetes cluster provided in the embodiment of the present disclosure, the apparatus further comprises: a third receiving unit, configured to, before controlling data interaction between the API server and the controllers based on the traffic configuration rules through the proxy container, receive data request instructions triggered by the API server through the proxy container; a first response unit, configured to, in response to the data request instructions, receive data sent by the API server through the proxy container.

For example, in the apparatus for processing load balancing of a Kubernetes cluster provided in the embodiment of the present disclosure, the first control unit 814 comprises: a first processing module, configured to filter the received data based on the traffic configuration rules in the proxy container to acquire the filtered data; and a first sending module, configured to send the filtered data to a controller corresponding to the proxy container.

For example, in the apparatus for processing load balancing of a Kubernetes cluster provided in the embodiment of the present disclosure, the first control unit 814 comprises: a first receiving module, configured to send data received by the proxy container to a controller corresponding to the proxy container; and a first calling module, configured to, when the controller corresponding to the proxy container triggers data processing, call an interface of the proxy container to determine whether the data conforms to the traffic configuration rules; if so, allow the controller corresponding to the proxy container to perform the data processing; and if not, disallow the controller corresponding to the proxy container to perform the data processing.

For example, in the apparatus for processing load balancing of a Kubernetes cluster provided in the embodiment of the present disclosure, the traffic configuration rules comprise: global limit rules and sharding routing rules, and after sending the traffic configuration rules to a proxy container corresponding to each of the controllers, the apparatus further comprises: a second sending unit, configured to intercept requests that do not conform to the global limit rules by the proxy container, and send requests that conform to the global limit rules to the API server; and/or a first determination unit, configured to intercept a Webhook request from the API server by the proxy container; determine whether the webhook request conforms to the sharding routing rules of a current instance; if so, forward the request to a local webhook of the proxy container for processing; and if not, forward the request to an instance that conforms to the rules for processing.

For example, in the apparatus for processing load balancing of a Kubernetes cluster provided in the embodiment of the present disclosure, the apparatus further comprises: a first setting unit, configured to set a security protection strategy in the proxy container, wherein the security protection strategy comprises at least one of the following: traffic limiting, fusing off, and one-click suspension.

For example, in the apparatus for processing load balancing of a Kubernetes cluster provided in the embodiment of the present disclosure, the apparatus further comprises: a first monitoring unit, configured to monitor interaction information between the controller and the API server through the proxy container; and a first display unit, configured to display the monitored information on a display interface.

It should be noted here that the first acquisition unit 810, first sending unit 812, and first control unit 814 described above perform steps correspond to steps S202 to S206 in the above method embodiment. The instances and application scenarios implemented by the three units and the corresponding steps are the same, but should not be limited to the content disclosed in the above-described method embodiment. It should be noted that as a part of the apparatus, the above-mentioned unit modules may run in computer terminal 100 provided in the above embodiment.

The embodiments of the present disclosure can provide a computer terminal, and the computer terminal may be any computer terminal device in a computer terminal group. For example, in this embodiment, the computer terminal may also be replaced with a terminal device such as a mobile terminal.

For example, in this embodiment, the computer terminal may be located in at least one of a plurality of network devices in a computer network.

In this embodiment, the above-mentioned computer terminal can execute the program code for the following steps in the method for processing load balancing of a Kubernetes cluster of an application program: acquiring traffic configuration rules for controllers in the Kubernetes cluster by a central control component of the Kubernetes cluster; sending the traffic configuration rules to a proxy container corresponding to each of the controllers; and controlling data interaction between the API server and the controllers through the proxy container based on the traffic configuration rules The above-mentioned computer terminal can also execute the program code for the following steps in the method for processing load balancing of a Kubernetes cluster of an application program: before controlling data interaction between the API server and the controllers based on the traffic configuration rules through the proxy container, receiving a data request instruction sent by at least one of a plurality of controllers through the proxy container; sending the data request instruction to the API server through the proxy container, and receiving the data sent by the API server.

The above-mentioned computer terminal can also execute the program code for the following steps in the method for processing load balancing of a Kubernetes cluster of an application program: before controlling data interaction between the API server and the controllers based on the traffic configuration rules through the proxy container, receiving a data request instruction triggered by the API server through the proxy container; and in response to the data request instruction, receiving the data sent by the API server through the proxy container.

The above-mentioned computer terminal can also execute the program code for the following steps in the method for processing load balancing of a Kubernetes cluster of an application program: filtering the received data in the proxy container based on the traffic configuration rules to acquire the filtered data; and sending the filtered data to the controller corresponding to the proxy container.

The above-mentioned computer terminal can also execute the program code for the following steps in the method for processing load balancing of a Kubernetes cluster of an application program: sending data received by the proxy container to a controller corresponding to the proxy container; when the controller corresponding to the proxy container triggers data processing, calling an interface of the proxy container to determine whether the data conforms to the traffic configuration rules; if so, allowing the controller corresponding to the proxy container to perform the data processing; and if not, disallowing the controller corresponding to the proxy container to perform the data processing.

The above-mentioned computer terminal can also execute the program code for the following steps in the method for processing load balancing of a Kubernetes cluster of an application program: global limit rules and sharding routing rules, after sending the traffic configuration rules to a proxy container corresponding to each of the controllers, the method further comprises: intercepting requests that do not conform to the global limit rules by the proxy container, and sending requests that conform to the global limit rules to the API server; and/or intercepting a webhook request from the API server by the proxy container; determining whether the webhook request conforms to the sharding routing rules of a current instance; if so, forwarding the request to the local webhook of the proxy container for processing; and if not, forwarding the request to an instance that conforms to the rule for processing.

The above-mentioned computer terminal can also execute the program code for the following steps in the method for processing load balancing of a Kubernetes cluster of an application program: setting a security protection strategy in the proxy container, wherein the security protection strategy comprises at least one of the following: traffic limiting, fusing off, and one-click suspension.

The above-mentioned computer terminal can also execute the program code for the following steps in the method for processing load balancing of a Kubernetes cluster of an application program: monitoring interaction information between the controller and the API server through the proxy container; and displaying the monitored information on a display interface.

Figure 9:
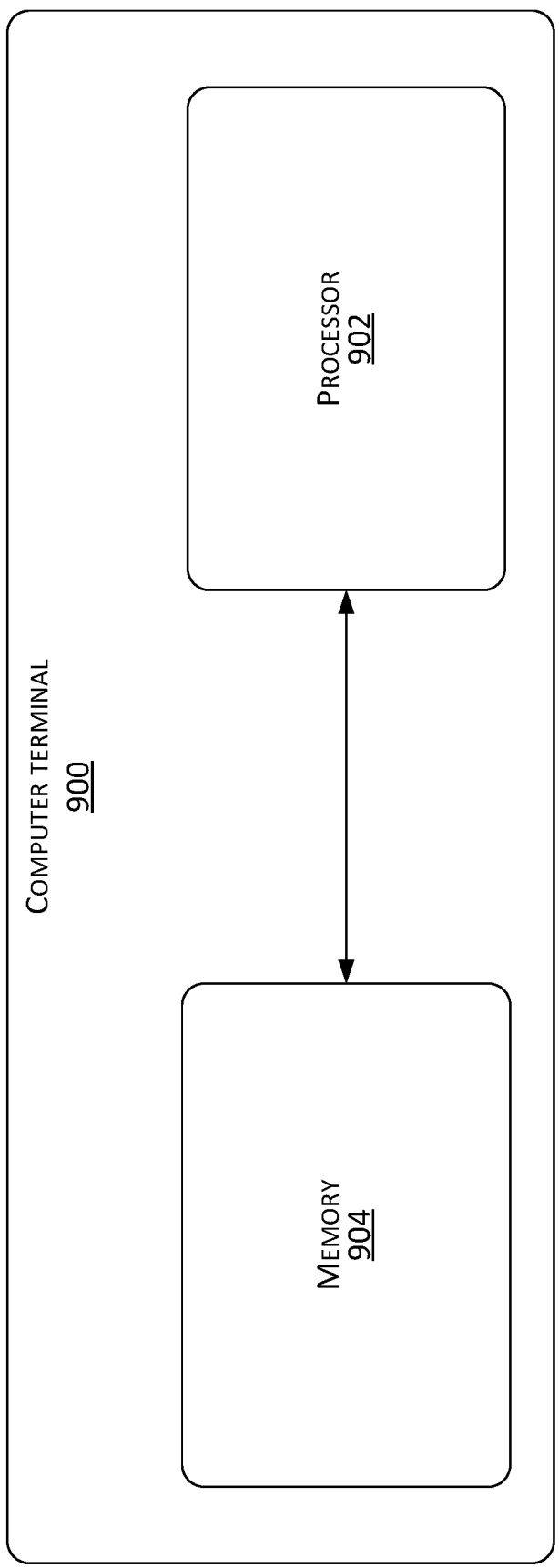
FIG. 9 is a structural block diagram of an example computer terminal according to an embodiment of the present disclosure.

For example, FIG. 9 is the hardware structural block diagram of a computer terminal according to an embodiment of the present disclosure. As shown in FIG. 9, the computer terminal 900 may comprise: one or more (only one is shown in FIG. 9) processors 902 and memories 904.

The memory may be configured to store software programs and modules, such as program instructions/modules corresponding to the method and apparatus for processing load balancing of a Kubernetes cluster in the embodiments of the present disclosure. The processor runs the software programs and modules stored in the memory to execute various function applications and data processing, implementing the above-described method for processing load balancing of a Kubernetes cluster. The memory may comprise a high-speed random access memory, and may also comprise a non-volatile memory, such as one or more magnetic storage apparatuses, flash memories, or other non-volatile solid-state memories. In some examples, the memory may further comprise memories remotely disposed with respect to the processor, and these remote memories may be connected to a terminal via a network. Examples of the above-mentioned network include, but are not limited to, the Internet, corporate intranets, local area networks, mobile communication networks, and combinations thereof.

The processor can call the information and application programs stored in the memory via a transmission apparatus to execute the following steps: acquiring traffic configuration rules for controllers in the Kubernetes cluster by a central control component of the Kubernetes cluster; sending the traffic configuration rules to a proxy container corresponding to each of the controllers; and controlling data interaction between the API server and the controllers through the proxy container based on the traffic configuration rules.

For example, the above-mentioned processor may also execute the program code for the following steps: before controlling data interaction between the API server and the controllers based on the traffic configuration rules through the proxy container, receiving a data request instruction sent by at least one of a plurality of controllers through the proxy container; sending the data request instruction to the API server through the proxy container, and receiving the data sent by the API server.

For example, the above-mentioned processor may also execute the program code for the following steps: before controlling data interaction between the API server and the controllers based on the traffic configuration rules through the proxy container, receiving a data request instruction triggered by the API server through the proxy container; and in response to the data request instruction, receiving data sent by the API server through the proxy container.

For example, the above-mentioned processor can also execute the program code for the following steps: filtering the received data in the proxy container based on the traffic configuration rules to acquire the filtered data; and sending the filtered data to the controller corresponding to the proxy container.

For example, the above-mentioned processor can also execute the program code for the following steps: sending the data received by the proxy container to a controller corresponding to the proxy container, when the controller corresponding to the proxy container triggers data processing, calling an interface of the proxy container to determine whether the data conforms to the traffic configuration rules; if so, allowing the controller corresponding to the proxy container to perform the data processing; and if not, disallowing the controller corresponding to the proxy container to perform the data processing.

For example, the above-mentioned processor can also execute the program code for the following steps: global limit rules and sharding routing rules, and after sending the traffic configuration rules to a proxy container corresponding to each of the controllers, intercepting requests that do not conform to the global limit rules by the proxy container, and sending requests that conform to the global limit rules to the API server; and/or intercepting the webhook request from the API server by the proxy container; determining whether the webhook request conforms to the sharding routing rules of a current instance; if so, forwarding the request to a local webhook of the proxy container for processing; and if not, forwarding the request to an instance that conforms to the rules for processing.

For example, the above-mentioned processor can also execute the program code for the following steps: setting a security protection strategy in the proxy container, wherein the security protection strategy comprises at least one of the following: traffic limiting, fusing off, and one-click suspension.

For example, the above-mentioned processor may also execute the program code for the following steps: monitoring interaction information between the controller and the API server through the proxy container; and displaying the monitored information on a display interface.

In the embodiments of the present disclosure, a solution of a method for processing load balancing of a Kubernetes cluster is provided. The data interaction between the API server and the controllers is controlled through the proxy container based on the pre-configured traffic configuration rules, specifically, acquiring the traffic configuration rules for the controllers in the Kubernetes cluster by a central control component of the Kubernetes cluster; sending the traffic configuration rules to a proxy container corresponding to each of the controllers; and controlling data interaction between the API server and the controllers through the proxy container based on the traffic configuration rules, so that a plurality of controllers can request data from the API server at the same time, and the data received by the controllers conforms to the rules in the traffic configuration rules, thereby realizing parallel running of the plurality of controllers, achieving the technical effect of load balancing of controllers in the Kubernetes cluster, and solving the technical problem that load balancing is difficult to achieve due to single-point operation of the controllers caused by a single master.

Those of ordinary skill in the art can understand that the structure shown in FIG. 9 is exemplary only; and the computer terminal may also be a smartphone (such as an Android phone and an iOS phone), a tablet computer, a palm computer, and a Mobile Internet Device (MID), a PAD, and other terminal devices. FIG. 9 does not limit the structure of the above mentioned electronic apparatuses. For example, computer terminal 900 may also comprise more or fewer components (such as a network interface, a display apparatus, etc.) than those shown in FIG. 9, or have a configuration different from that shown in FIG. 9.

Those of ordinary skill in the art can understand that all or part of the steps in the various methods of the above-mentioned embodiments can be completed by instructing relevant hardware of a terminal device through a program. The program can be stored in a computer-readable storage medium, which may include: a flash disk, a read-only memory (ROM), a random access memory (RAM), a magnetic disk, an optical disk, or the like.

The embodiment of the present disclosure also provides a storage medium. For example, in this embodiment, the storage medium described above may be configured to store program codes to be executed by the method for processing load balancing of a Kubernetes cluster provided in the above-described method embodiment.

For example, in this embodiment, the storage medium may be located in any computer terminal of a computer terminal group in a computer network, or located in any mobile terminal of a mobile terminal group.

For example, in this embodiment, the storage medium is configured to store program codes for executing the following steps: acquiring traffic configuration rules for controllers in the Kubernetes cluster by a central control component of the Kubernetes cluster; sending the traffic configuration rules to a proxy container corresponding to each of the controllers; and controlling data interaction between the API server and the controllers through the proxy container based on the traffic configuration rules.

For example, in this embodiment, the storage medium is configured to store program codes that are also used to execute the following steps: before controlling data interaction between the API server and the controllers based on the traffic configuration rules through the proxy container, receiving a data request instruction sent by at least one of a plurality of controllers through the proxy container; sending the data request instruction to the API server through the proxy container, and receiving the data sent by the API server.

For example, in this embodiment, the storage medium is configured to store program codes that are also used for executing the following steps: before controlling data interaction between the API server and the controllers based on the traffic configuration rules through the proxy container, receiving a data request instruction triggered by the API server through the proxy container; and in response to the data request instruction, receiving data sent by the API server through the proxy container.

For example, in this embodiment, the storage medium is configured to store program codes that are also used to execute the following steps: filtering the received data in the proxy container based on the traffic configuration rules to acquire the filtered data; and sending the filtered data to the controller corresponding to the proxy container.

For example, in this embodiment, the storage medium is configured to store program codes that are also used to execute the following steps: sending the data received by the proxy container to a controller corresponding to the proxy container, when the controller corresponding to the proxy container triggers data processing, calling an interface of the proxy container to determine whether the data conforms to the traffic configuration rules; if so, allowing the controller corresponding to the proxy container to perform the data processing; and if not, disallowing the controller corresponding to the proxy container to perform the data processing.

For example, in this embodiment, the storage medium is configured to store program codes that are also used to execute the following steps: global limit rules and sharding routing rules, and after sending the traffic configuration rules to a proxy container corresponding to each of the controllers, intercepting requests that do not conform to the global limit rules by the proxy container, and sending requests that conform to the global limit rules to the API server; and/or intercepting the webhook request from the API server by the proxy container; determining whether the webhook request conforms to the sharding routing rules of a current instance; if so, forwarding the request to a local webhook of the proxy container for processing; and if not, forwarding the request to an instance that conforms to the rules for processing.

For example, in this embodiment, the storage medium is configured to store program codes that are also used to execute the following steps: setting a security protection strategy in the proxy container, wherein the security protection strategy comprises at least one of the following: traffic limiting, fusing off, and one-click suspension.

For example, in this embodiment, the storage medium is configured to store program codes that are also used to execute the following steps: monitoring interaction information between the controller and the API server through the proxy container; and displaying the monitored information on a display interface.

The serial numbers of the embodiments of the present disclosure are merely for description, and do not represent the quality of the embodiments.

In the above-described embodiments of the present disclosure, the description of each embodiment has its own emphasis. For any part that is not described in detail in one embodiment, reference may be made to related descriptions in other embodiments.

In the several embodiments provided by the present disclosure, it should be appreciated that the disclosed technical content may be implemented in other manners. The apparatus embodiments described above are for illustration only. For example, the division of the units is merely a logical function division. In actual implementation, there may be other division means. For example, multiple units or components may be combined or may be integrated into another system, or some features may be disregarded or left unimplemented. In addition, the displayed or discussed mutual coupling, direct coupling, or communication connection may be achieved through indirect coupling or communication connection of some interfaces, units, or modules, and may be in electrical or other forms.

Units described as separate components may or may not be physically separated. A component displayed as a unit may or may not be a physical unit; that is, it may be located in one place or may be distributed on multiple network units. Some or all of the units may be selected according to actual needs to achieve the objects of the solutions of the embodiments.

In addition, various function units in each embodiment of the present disclosure may be integrated into one processing unit, or each unit may be individually and physically present, or two or more units may be integrated into one unit. The above-mentioned integrated units may be implemented in the form of hardware or may be implemented as software function units.

If an integrated unit is implemented in the form of software function unit and sold or used as an independent product, it may be stored in a computer-readable storage medium. Based on such an understanding, the part of the technical solution of the present disclosure or all or part of the technical solution, which is essential or contributes to the prior art, can be embodied in the form of a software product. The computer software product is stored in a storage medium and includes several instructions for enabling a computer device (which may be a personal computer, a server, a network device, or the like) to execute all or part of the steps of the method of each embodiment of the present disclosure. The above-mentioned storage medium includes: USB flash disks, read-only memories (ROMs), random access memories (RAMs), mobile hard disks, magnetic disks, optical disks, or other media that may store program codes.

The above-described embodiments are merely example embodiments of the present disclosure. It should be noted that for those of ordinary skill in the art, several improvements and modifications may be made without departing from the principles of the present disclosure. These improvements and modifications should also be deemed as falling within the protection scope of the present disclosure.

The present disclosure may further be understood with clauses as follows:

Clause 1. A method for processing load balancing of a Kubernetes cluster, comprising:
acquiring traffic configuration rules for controllers in the Kubernetes cluster by a central control component of the Kubernetes cluster;
sending the traffic configuration rules to a proxy container corresponding to each of the controllers; and
controlling data interaction between an API server and the controllers through the proxy container based on the traffic configuration rules.

Clause 2. The method according to clause 1, wherein before controlling data interaction between an API server and the controllers through the proxy container based on the traffic configuration rules, the method further comprises:
receiving a data request instruction sent by at least one of a plurality of controllers through the proxy container; and
sending the data request instruction to the API server through the proxy container, and receiving data sent by the API server.

Clause 3. The method according to clause 1, wherein before controlling data interaction between an API server and the controllers through the proxy container based on the traffic configuration rules, the method further comprises:
receiving a data request instruction triggered by the API server through the proxy container; and
in response to the data request instruction, receiving data sent by the API server through the proxy container.

Clause 4. The method according to clause 2 or 3, wherein the controlling data interaction between an API server and the controllers through the proxy container based on the traffic configuration rules comprises:
filtering the received data based on the traffic configuration rules in the proxy container to acquire the filtered data; and
sending the filtered data to a controller corresponding to the proxy container.

Clause 5. The method according to clause 1, wherein the controlling data interaction between an API server and the controllers through the proxy container based on the traffic configuration rules comprises:
sending data received by the proxy container to a controller corresponding to the proxy container; and
when the controller corresponding to the proxy container triggers data processing, calling an interface of the proxy container to determine whether the data conforms to the traffic configuration rules; if so, allowing the controller corresponding to the proxy container to perform the data processing; and if not, disallowing the controller corresponding to the proxy container to perform the data processing.

Clause 6. The method according to clause 1, wherein the traffic configuration rules comprise global limit rules and sharding routing rules, and after sending the traffic configuration rules to a proxy container corresponding to each of the controllers, the method further comprises:
intercepting requests that do not conform to the global limit rules by the proxy container, and sending requests that conform to the global limit rules to the API server; and/or
intercepting a webhook request from the API server by the proxy container; determining whether the webhook request conforms to the sharding routing rules of a current instance; if so, forwarding the request to a local Webhook of the proxy container for processing; and if not, forwarding the request to an instance for which the webhook request conforms to the sharding routing rule of the another instance for processing.

Clause 7. The method according to clause 1, wherein the method further comprises: setting a security protection strategy in the proxy container, wherein the security protection strategy comprises at least one of the following: traffic limiting, fusing off, and one-click suspension.

Clause 8. The method according to clause 1, wherein the method further comprises:
monitoring interaction information between the controller and the API server through the proxy container; and
displaying the monitored information on a display interface.

Clause 9. An apparatus for processing load balancing of a Kubernetes cluster, comprising:
a first acquisition unit, configured to acquire traffic configuration rules for controllers in the Kubernetes cluster by a central control component of the Kubernetes cluster;
a first sending unit, configured to send the traffic configuration rules to a proxy container corresponding to each of the controllers; and
a first control unit, configured to control data interaction between an API server and the controllers through the proxy container based on the traffic configuration rules.

Clause 10. The apparatus according to clause 9, wherein the apparatus further comprises:
a first receiving unit, configured to, before controlling data interaction between an API server and the controllers through the proxy container based on the traffic configuration rules, receive a data request instruction sent by at least one of a plurality of controllers through the proxy container; and
a second receiving unit, configured to send the data request instruction to the API server through the proxy container, and receive data sent by the API server.

Clause 11. The apparatus according to clause 9, wherein the apparatus further comprises:
a third receiving unit, configured to, before controlling data interaction between an API server and the controllers through the proxy container based on the traffic configuration rules, receive a data request instruction triggered by the API server through the proxy container; and
a first response unit, configured to, in response to the data request instruction, receive data sent by the API server through the proxy container.

Clause 12. The apparatus according to clause 9, wherein the first control unit comprises:
a first processing module, configured to filter the received data based on the traffic configuration rules in the proxy container to acquire the filtered data; and
a first sending module, configured to send the filtered data to a controller corresponding to the proxy container.

Clause 13. The apparatus according to clause 9, wherein the first control unit comprises:
a first receiving module, configured to send data received by the proxy container to a controller corresponding to the proxy container; and
a first calling module, configured to, when the controller corresponding to the proxy container triggers data processing, call an interface of the proxy container to determine whether the data conforms to the rules based on the traffic configuration rules; if so, allow the controller corresponding to the proxy container to perform the data processing; and if not, disallow the controller corresponding to the proxy container to perform the data processing.

Clause 14. The apparatus according to clause 9, wherein the traffic configuration rules comprise global limit rules and sharding routing rules, and after sending the traffic configuration rules to a proxy container corresponding to each of the controllers, the apparatus further comprises:
a second sending unit, configured to intercept requests that do not conform to the global limit rules by the proxy container, and send requests that conform to the global limit rules to the API server; and/or
a first determination unit, configured to intercept a webhook request from the API server by the proxy container; determine whether the webhook request conforms to the sharding routing rules of a current instance; if so, forward the request to a local Webhook of the proxy container for processing; and if not, forward the request to an instance that conforms to the rules for processing.

Clause 15. The apparatus according to clause 9, wherein the apparatus further comprises:
a first setting unit, configured to set a security protection strategy in the proxy container, wherein the security protection strategy comprises at least one of the following: traffic limiting, fusing off, and one-click suspension.

Clause 16. The apparatus according to clause 9, wherein the apparatus further comprises:
a first monitoring unit, configured to monitor interaction information between the controller and the API server through the proxy container; and
a first display unit, configured to display the monitored information on a display interface.

Clause 17. A storage medium having a program stored therein, wherein the program executes the method described in any one of clauses 1 to 8.

Clause 18. A device, comprising:
a processor; and
a storage medium, connected to the processor and configured to provide the processor with instructions for processing the following processing steps:
acquiring traffic configuration rules for controllers in the Kubernetes cluster by a central control component of the Kubernetes cluster;
sending the traffic configuration rules to a proxy container corresponding to each of the controllers; and
controlling data interaction between an API server and the controllers through the proxy container based on the traffic configuration rules.

What is claimed is:
1. A method comprising:
acquiring traffic configuration rules for controllers in a cluster by a central control component of the cluster, the cluster being a Kubernetes cluster;
sending the traffic configuration rules to a proxy container corresponding to each of the controllers; and
controlling a data interaction between an API server and the controllers through the proxy container based on the traffic configuration rules, the controlling the data interaction between the API server and the controllers through the proxy container based on the traffic configuration rules comprising:
sending data received by the proxy container to a controller corresponding to the proxy container;
in response to determining that the controller corresponding to the proxy container triggers data processing, calling an interface of the proxy container to determine that the data conforms to the traffic configuration rules; and in response to determining that the data conforms to the traffic configuration rules, allowing the controller corresponding to the proxy container to perform a data processing.

2. The method according to claim 1, wherein before the controlling the data interaction between the API server and the controllers through the proxy container based on the traffic configuration rules, the method further comprises:
receiving a data request instruction sent by at least one of the controllers through the proxy container;
sending the data request instruction to the API server through the proxy container; and
receiving data sent by the API server.

3. The method according to claim 1, wherein before the controlling the data interaction between the API server and the controllers through the proxy container based on the traffic configuration rules, the method further comprises:
receiving a data request instruction triggered by the API server through the proxy container; and
in response to the data request instruction, receiving data sent by the API server through the proxy container.

4. The method according to claim 3, wherein the controlling the data interaction between the API server and the controllers through the proxy container based on the traffic configuration rules comprises:
filtering the received data based on the traffic configuration rules in the proxy container to acquire the filtered data; and
sending the filtered data to a controller corresponding to the proxy container.

5. The method according to claim 1, wherein the controlling the data interaction between the API server and the controllers through the proxy container based on the traffic configuration rules further comprises:
in response to determining that the data does not conform to the traffic configuration rules, disallowing the controller corresponding to the proxy container to perform the data processing.

6. The method according to claim 1, wherein:
the traffic configuration rules comprise a global limit rule; and
after the sending the traffic configuration rules to the proxy container corresponding to each of the controllers, the method further comprises:
intercepting a request that does not conform to the global limit rule by the proxy container; or
sending a request that conforms to the global limit rule to the API server.

7. The method according to claim 1, wherein:
the traffic configuration rules comprise a sharding routing rule; and
after sending the traffic configuration rules to a proxy container corresponding to each of the controllers, the method further comprises:
intercepting a webhook request from the API server by the proxy container;
determining that the webhook request conforms to the sharding routing rule of a current instance; and
forwarding the webhook request to a local webhook of the proxy container for processing.

8. The method according to claim 1, wherein:
the traffic configuration rules comprise a sharding routing rule; and
after sending the traffic configuration rules to a proxy container corresponding to each of the controllers, the method further comprises:
intercepting a webhook request from the API server by the proxy container;
determining that the webhook request does not conform to the sharding routing rule of a current instance; and
forwarding the webhook request to an instance for which the webhook request conforms to the sharding routing rule of the instance for processing.

9. The method according to claim 1, wherein the method further comprises:
setting a security protection strategy in the proxy container, wherein the security protection strategy comprises at least one of following: traffic limiting, fusing off, and one-click suspension.

10. The method according to claim 1, wherein the method further comprises:
monitoring interaction information between the controller and the API server through the proxy container; and
displaying the monitored interaction information on a display interface.

11. An apparatus comprising:
one or more processors; and
one or more memories storing thereon computer-readable instructions that, when executed by the one or more processors, cause the one or more processors to perform acts comprising:
acquiring traffic configuration rules for controllers in a cluster by a central control component of the cluster, the cluster being a Kubernetes cluster;
sending the traffic configuration rules to a proxy container corresponding to each of the controllers; and
controlling a data interaction between an API server and the controllers through the proxy container based on the traffic configuration rules, the controlling the data interaction between the API server and the controllers through the proxy container based on the traffic configuration rules comprising:
sending data received by the proxy container to a controller corresponding to the proxy container;
in response to determining that the controller corresponding to the proxy container triggers data processing, calling an interface of the proxy container to determine that the data conforms to the traffic configuration rules; and
in response to determining that the data conforms to the traffic configuration rules, allowing the controller corresponding to the proxy container to perform a data processing.

12. The apparatus of claim 11, wherein before the controlling the data interaction between the API server and the controllers through the proxy container based on the traffic configuration rules, the acts further comprise:
receiving a data request instruction sent by at least one of the controllers through the proxy container;
sending the data request instruction to the API server through the proxy container; and
receiving data sent by the API server.

13. The apparatus according to claim 11, wherein before the controlling data interaction between the API server and the controllers through the proxy container based on the traffic configuration rules, the acts further comprise:
receiving a data request instruction triggered by the API server through the proxy container; and
in response to the data request instruction, receiving data sent by the API server through the proxy container.

14. The apparatus according to claim 13, wherein the controlling the data interaction between the API server and the controllers through the proxy container based on the traffic configuration rules further comprises:
 filtering the received data based on the traffic configuration rules in the proxy container to acquire filtered data; and
 sending the filtered data to a controller corresponding to the proxy container.

15. The apparatus according to claim 11, wherein the controlling the data interaction between the API server and the controllers through the proxy container based on the traffic configuration rules further comprises:
 in response to determining that the data does not conform to the traffic configuration rules, disallowing the controller corresponding to the proxy container to perform the data processing.

16. One or more memories storing thereon computer-readable instructions that, when executed by one or more processors, cause the one or more processors to perform acts comprising:
 acquiring traffic configuration rules for controllers in a cluster by a central control component of the cluster, the cluster being a Kubernetes cluster;
 sending the traffic configuration rules to a proxy container corresponding to each of the controllers; and
 controlling a data interaction between an API server and the controllers through the proxy container based on the traffic configuration rules, the controlling the data interaction between the API server and the controllers through the proxy container based on the traffic configuration rules comprising:
  sending data received by the proxy container to a controller corresponding to the proxy container;
  in response to determining that the controller corresponding to the proxy container triggers data processing, calling an interface of the proxy container to determine that the data conforms to the traffic configuration rules; and
  in response to determining that the data conforms to the traffic configuration rules, allowing the controller corresponding to the proxy container to perform a data processing.

17. The one or more memories of claim 16, wherein before the controlling the data interaction between the API server and the controllers through the proxy container based on the traffic configuration rules, the acts further comprise:
 receiving a data request instruction sent by at least one of the controllers through the proxy container;
 sending the data request instruction to the API server through the proxy container; and
 receiving data sent by the API server.

18. The one or more memories according to claim 16, wherein the controlling the data interaction between the API server and the controllers through the proxy container based on the traffic configuration rules further comprises:
 in response to determining that the data does not conform to the traffic configuration rules, disallowing the controller corresponding to the proxy container to perform the data processing.

19. The one or more memories according to claim 16, wherein:
 the traffic configuration rules comprise a global limit rule; and
 after the sending the traffic configuration rules to the proxy container corresponding to each of the controllers, the acts further comprise:
  intercepting a request that does not conform to the global limit rule by the proxy container; or
  sending a request that conforms to the global limit rule to the API server.

20. The one or more memories according to claim 16, wherein:
 the traffic configuration rules comprise a sharding routing rule; and
 after sending the traffic configuration rules to a proxy container corresponding to each of the controllers, the acts further comprise:
 intercepting a webhook request from the API server by the proxy container;
 determining that the webhook request conforms to the sharding routing rule of a current instance; and
 forwarding the webhook request to a local webhook of the proxy container for processing.

* * * * *